United States Patent [19]
Doherty et al.

[11] Patent Number: 5,991,772
[45] Date of Patent: *Nov. 23, 1999

[54] METHOD AND APPARATUS FOR RESTORING A PORTION OF A DATABASE

[75] Inventors: Cornelius G Doherty, San Francisco; Gregory Pongracz, Redwood City; William Bridge, Alameda; Juan R Loaiza, San Carlos; Mark Ramacher, San Mateo, all of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,539

[22] Filed: Oct. 31, 1997

[51] Int. Cl.$^6$ .................................................. G06F 17/30
[52] U.S. Cl. .................................. 707/202; 707/1; 707/2; 707/3; 707/10; 707/100; 707/202
[58] Field of Search ............................ 707/2, 3, 10, 200, 707/202, 100, 204, 1

[56] References Cited

U.S. PATENT DOCUMENTS

| | | | |
|---|---|---|---|
| 4,791,561 | 12/1988 | Huber | 707/1 |
| 4,817,050 | 3/1989 | Komatsu et al. | 364/900 |
| 4,945,474 | 7/1990 | Elliott et al. | 395/182.14 |
| 5,295,256 | 3/1994 | Bapat | 395/500 |
| 5,455,946 | 10/1995 | Mohan et al. | 707/202 |
| 5,678,046 | 10/1997 | Cahill et al. | 707/200 |
| 5,721,915 | 2/1998 | Sockut et al. | 707/200 |
| 5,740,457 | 4/1998 | Shiomi | 707/533 |
| 5,826,257 | 10/1998 | Snelling, Jr. | 707/4 |

OTHER PUBLICATIONS

Microsoft Windows Help 4.00.5000, Copyright 1990–1995 Microsoft Corp., Microsoft SQL Enterprise Manager Online Help.

*Primary Examiner*—Jack M. Choules
*Assistant Examiner*—Shahid Alam
*Attorney, Agent, or Firm*—Law Offices of Charles E. Gotlieb

[57] ABSTRACT

A method and system allows a part of a database to be restored using a subset of the backup files stored for a database. A working copy of the data dictionary of the database, which stores data definitions, is restored using the latest backup file stored not later than the point in time specified and the names of tablespaces related to the table names specified are identified using the data dictionary. The files storing the database tablespaces specified and those identified as related are identified for restoration along with the point in time specified, so that the backup files may be used to restore the files to the latest time prior to the point in time specified. The database data files are [restored, they] are rolled forward from the point in time of the backup files to the point in time specified, using transaction logs restored with the database data files and the restored working data dictionary is updated as described by the transaction logs. The working data dictionary is then spliced into the database data dictionary, and the database control file is adjusted to point to the restored database data files.

35 Claims, 4 Drawing Sheets

METHOD AND APPARATUS FOR RESTORING A PORTION OF A DATABASE

RELATED APPLICATIONS

The subject matter of this application is related to the subject matter of application Ser. No. 08/962,087 entitled, "METHOD AND APPARATUS FOR IDENTIFYING FILES USED TO RESTORE A FILE" filed on Oct. 31, 1997 by Gregory Pongracz, Steven Wertheimer and William Bridge, application Ser. No. 08/962,086 entitled, "METHOD AND APPARATUS FOR EFFICIENTLY BACKING UP FILES USING MULTIPLE COMPUTER SYSTEMS" filed on Oct. 31, 1997 by Gregory Pongracz, Steven Wertheimer and William Bridge, application Ser. No. 08/961,747 entitled, "METHOD AND APPARATUS FOR PRESERVING NON-CURRENT INFORMATION THAT CAN BE OVERWRITTEN IN A COMPUTER FILE" filed on Oct. 31, 1997 by Gregory Pongracz and Tuomas Pystynen, application Ser. No. 08/961,741 entitled, "METHOD AND APPARATUS FOR ACCESSING A FILE THAT CAN BE CONCURRENTLY WRITTEN" filed on Oct. 31, 1997 by Tuomas Pystynen and Gregory Pongracz having the same assignee as this application and incorporated herein by reference in its entirety.

FIELD OF THE INVENTION

The present invention is related to computer database programs, and more specifically to the backup and restoration of files used by computer database programs.

BACKGROUND OF THE INVENTION

Computer database programs allow a user to store data in one or more tables of a database. Some conventional computer database programs group one or more tables or portions of tables into a single named unit, such as a tablespace in the conventional Oracle8 product available from Oracle Corporation of Redwood Shores, Calif. As used herein, a "tablespace" is any group of one or more tables or portions of tables in a database.

Computer database programs store information in one or more files. In addition to storing the data used by the users of the database, conventional database programs maintain information about the data in the database in order to allow the database to operate. Information about the data may include definition information about the type and arrangement of the data stored in the data files, and information about the locations and names of the files that store the information used by, or stored in, the database. Some conventional databases, such as the Oracle8 product available from Oracle Corporation of Redwood Shores, Calif., store data in a database in one or more data files, store information about the type and arrangement of the data in the database in a data dictionary file, and store information about the files related to a database in a control file.

Because computer files such as database files may become damaged or corrupted, an operator may make backup copies of the database files. Backup copies made at many points in time may be retained to allow the file to be restored as of any of those points in time.

If any one of the database files is damaged or corrupted, some conventional database programs require an operator to use the backup files to restore all of the files associated with a database. Because large databases may contain many files of data, this approach can be burdensome to the person who must restore the various files and can seem especially burdensome if only one of the many files to be restored is actually damaged or corrupted.

There is an additional reason why restoration to a particular point in time of only part of a database is desirable. If erroneous changes are made to one part of the database, but correct changes are made to another part of the database, the user must correct the erroneous changes. To do this, the user is faced with two choices to correct the database. The erroneous changes can be backed out, manually for example, and then reentered, a laborious process that itself is prone to error. Alternatively, the user can first restore the database to the point in time of the most recent backup file in which the erroneous changes did not exist in the database. However, if the database does not allow transaction logs to be used to automatically enter only the correct changes without the erroneous changes, the user must re-enter the correct changes, a potentially laborious process prone to error.

Even if the database is restored to a point in time of one of the backup files, because the backup files are made at discrete intervals, it may not be possible to restore the database to just before the precise point in time the erroneous changes were first introduced into the database. As a result, correct changes in both portions of the database from the point in time of the backup used to restore the database to the point in time the erroneous changes were made to the database will not exist in the database following the restoration, and may have to be reentered.

Because the files not damaged or corrupted may be interrelated with the damaged or corrupted file or files, it may not be possible to simply restore the file containing the damaged or corrupt information. For example, the information contained in the database tablespaces may be stored in one file and the data definition information may be stored in another file. If the definitions of the data in the data dictionary have changed since a damaged database data file was last backed up, merely restoring the damaged data file would cause the restored data file to be inconsistent with the definitions stored in the data dictionary file. If other database tablespaces are stored in other database data files, other database data files may be related to the damaged data file, and these files may have also changed after the backup of the damaged data file. Merely restoring the damaged the data file could cause the other related database data files to become inconsistent with the restored database data file.

Some conventional database programs implement built in mechanisms to allow automated recovery of a part of the database. However, to allow the recovery of a part of the database, the database program must compute and maintain additional information during regular operation of the database. This can slow the operation of the database during processing of regular, day-to-day transactions.

There is therefore a need for a system and method to allow a party to restore a part of a database to a particular point in time that may not match a point in time the database was backed up, without restoring all of the files associated with the database and without slowing the performance of the database in processing regular transactions.

SUMMARY OF INVENTION

A method and system restores a portion of a production database using backup files. The database name and the names of the tablespaces to be restored are received, along with a point in time to which the portion of the database is to be restored. A control file maintained by the database, containing the names of the files used by the database, is identified and used to determine and identify the names of all files needed for the restoration. The files needed for restoration include the data files containing the tablespaces specified, other data files containing data related to the tablespaces specified, data dictionary files containing data definitions of these data files, and optionally, an older version of the control file. If transaction logs exist in a different file, transaction logs sufficient to roll the database forward from the point in time of the backup files to the specified point in time are also identified for restoration. After restoration of these files into a working storage area in such a manner that will not overwrite the files of the production database, the restored data files are rolled forward using the transaction logs, a process that may also adjust the restored data dictionary. The definitions of the tables in the specified tablespaces and the related tablespaces from the restored and adjusted data dictionary are spliced into the data dictionary for the production database. The control file of the production database or the filenames of the restored data files are adjusted so that the production control file points to the restored and rolled forward data files.

The present invention allows a portion of the database to be automatically restored to a point in time that does not need to match the point in time of database backup files, without causing inconsistencies in the database, requiring all of the database files to be restored or slowing the performance of the database in processing regular transactions.

DETAILED DESCRIPTION OF A PREFERRED EMBODIMENT

Figure 1:
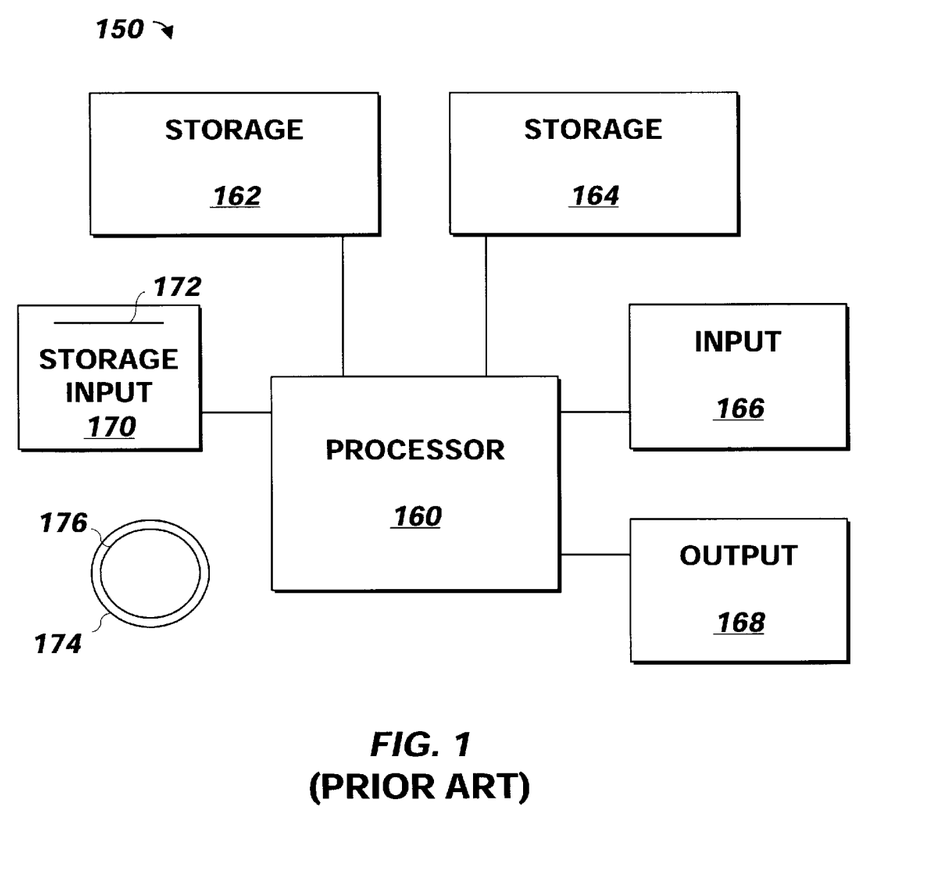
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used.

Figure 2:
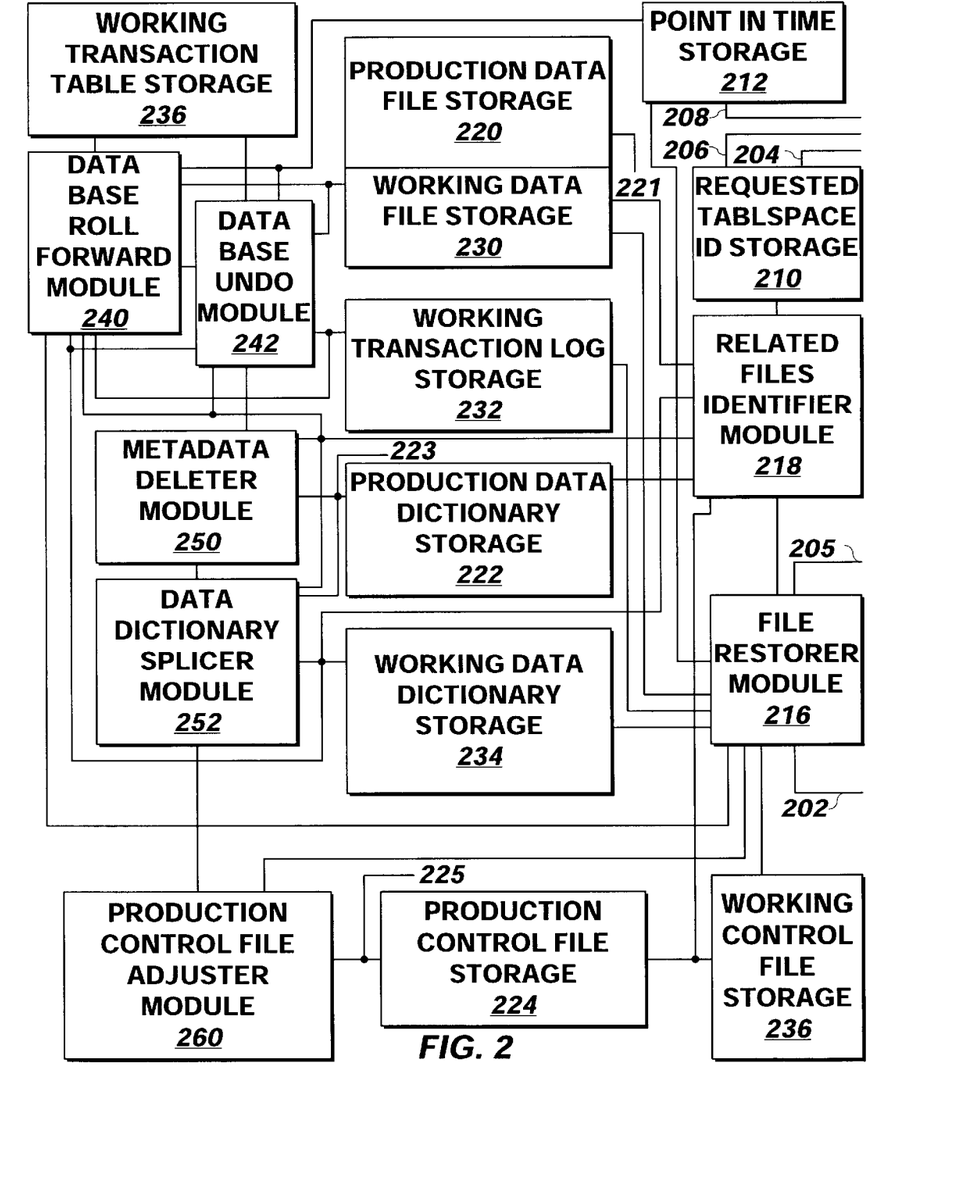
FIG. 2 is a block schematic diagram of a system for recovering a part of a database according to one embodiment of the present invention.

Referring now to FIG. 2, a system for recovering a part of a database is shown according to one embodiment of the present invention. As described herein, an operating version of a database is referred to as a "production database" stored in production storage areas described below, and files such as backup files of the production database are stored in "working" storage areas described below. In one embodiment, each database contains a collection of one or more tablespaces, and each tablespace may be stored in one or more data files. The files storing information from a tablespace may also store information from other tablespaces or indexes. Administrative information may also be stored in the same or different files. In one embodiment, administrative information includes transaction logs, the data dictionary, and a control file. The transaction logs describe each transaction performed by the database, and are stored in separate files. The data dictionary describes the data contained in each of the tablespaces of the database, including the data type and size of each column in the database. The control file includes the file names and locations of each file associated with the database.

Production data file storage 220 stores the data files containing the production database tablespaces, received via input 221. Production data dictionary storage 222 stores the data dictionary, received via input 223, that contains the definitions for the data in the tablespaces stored in production data file storage 220. Production control file storage 224 stores the control file received at input 225, a file that contains the filenames, including path identifiers, for all the files associated with the database, including the data files and data dictionary file. In one embodiment, each database contains a single data dictionary. In another embodiment, more than one data dictionary may be used for a database. In the embodiment disclosed, the data files, data dictionary, and control file are separate files. However, in other embodiments, some or all of these files may be merged together. In such embodiment, production data file storage 220, production data dictionary storage 222, and production control file storage 224 may hold the described portions of the file or files containing the described information. Production data file storage 220, production data dictionary storage 222, and production control file storage 224 may be an area of conventional memory or disk.

In one embodiment, the database is made of one or more tablespaces, and if one or more tablespaces is determined to be damaged or corrupt, the user may specify both the name of each tablespace, located in a data file, to be restored and a point in time to which the user desires to restore the tablespace. The user inputs to input 206, coupled to a keyboard and mouse or other input device or combination, the name of the database or control file or other identifier of the database, and the name or other identifier of each of the tablespaces he or she desires to restore. The point in time to which these tablespaces are to be restored is input via input 204, coupled to a keyboard and mouse or other input device or combination. The point in time may be input to input 204 in terms of a date, date and time, or a transaction number or other identifier corresponding to a state of the database at a particular moment or period of time. The name or names of the tablespace or tablespaces to be restored and the point in time to which they are to be restored are stored in requested tablespace ID storage 210.

As described in more detail below, the system of FIG. 2 identifies all necessary database files to restore, accepts the restored files, stores them as a working set of files and updates the working set of files to match the state of the working set of files to the state they were in at the point in time desired by the user. The system of FIG. 2 then integrates the working files into the production database.

The system shown in FIG. 2 identifies the files that are to be restored. Requested tablespace ID storage 210 passes the names of the tablespaces it receives to related files identifier module 218. Related files identifier module 218 obtains the file names associated with the tablespaces it receives by searching for these tablespaces in production control file storage 224 and reading the associated file names. The file names obtained by related files identifier module 218 include the names of the data files and the name of the file holding the data dictionary for these data files. These file names and the point in time specified are output by file restorer module 216 to output 202.

In one embodiment, production control file storage 224 maintains the control file described above in a temporal fashion, as described in related application, Ser. No. 08/961,747, retaining older data and appending the effective date of any changes made. This allows related files identifier module 218 to retrieve the file names from the production control file storage 224 as the control file existed at the point in time received by related file identifier module 218. In another embodiment, the control file is not stored in a temporal fashion. In such embodiment, the production control file stored in production control file storage 224 is used, by assuming that no changes have occurred to the file names stored in production control file storage 224. In still another embodiment, the production control file as it existed at the point in time received by related files identifier module 218 is identified for restoration by files restorer module 216. In one embodiment, input 205, connected to a keyboard and mouse or other input device or combination, receives the name of the production control files and this name is stored file restorer module 216. File restore module 216 also receives the point in time from requested tablespace ID storage 210 or from related files identifier module 218 and uses the filename and the point in time to identify a backup copy of the control file as it existed as near as possible to the point in time. File restore module 216 obtains using input/output 202 the production control file and stores it in working production control file storage 236. In one embodiment, this is performed by sending the filename of the production control file and a point in time via input/output 202 to a device such as the one described in copending application Ser. No. 08/962,087 and receiving the file via input/output 202. In such embodiment, related files identifier module 218 uses the working production control file stored in working production control file storage 236 instead of the control file stored in production control file storage 224 as described above.

In one embodiment, the data dictionary backed up immediately prior to the point in time received by related files identifier module 218 is restored into working data dictionary storage 234. This restoration is accomplished by related files identifier module 218 passing the point in time to file restorer module 216 and directing file restore module 216 to identify the data dictionary backed prior to the point in time. In such embodiment, the filename of the data dictionary is received at input 206 and passed from requested tablespace ID storage 210 to related files identifier module 208. Related files identifier module 218 passes the filename to file restorer module 216. In another embodiment, the filename of the data dictionary is identified by the related files identifier module 218 reading the name and location of the data dictionary from the control file stored in working control file storage 236 or production control file storage 224. File restore module 216 identifies the filename of the data dictionary and point in time specified at output 202 indicating a request for restoration of the file as late as possible but not later than the point in time specified.

In one embodiment, the data dictionary is stored in a single file, but in another embodiment, the data dictionary is stored in multiple files. In such other embodiment, the filenames of the data dictionary are used in place of the filename of the data dictionary set forth herein.

The restoration may be performed using any file restoration method or apparatus, including those described in copending application, attorney docket number 1028, Ser. No. 08/962,087. File restorer module 216 receives the restored data dictionary file via input 202 and stores the file in working data dictionary storage 234.

Related files identifier module 218 stores all tablespace names received or identified as described above. Related files identifier module 218 passes to file restorer module 216 the file names and file locations of all tablespaces received and identified as related. In addition, requested tablespace ID storage 210 passes the point in time it receives to related files identifier module 218. Related files identifier module 218 passes the point in time to file restore module 216. In an alternative embodiment of the present invention, the point in time is passed directly from requested tablespace ID storage 210 to file restore module 216, using a connection (not shown) between requested tablespace ID storage 210 and the file restorer module 216.

File restorer module 216 passes the filenames and point in time specified to output 202. Any method may be used to restore the backup files corresponding to the files having the names and locations received from related files identifier module 218 as near as possible, but not later than the point in time received from related files identifier module 218. This method may include conventional file restoration methods, or may include the file restoration method described in copending application Ser. No. 08/962,087. File restorer module 216 receives these files via input/output 202 and stores the restored data files in working data file storage 230. In one embodiment, file restorer module 216 restores these files onto the same storage device, such as a disk, as the production files. File restorer module 216 names each file it restores to have a name different from the corresponding production file. This allows the continued use of the production files during the restoration process if working data file storage 230 is located on the same device such as a disk as the device storing production data file storage 220.

Related files identifier module 218 also identifies filenames of tablespaces that are related to the tablespaces corresponding to the names the related files identifier module 218 receives. Tablespaces related to the tablespaces having the names received are any tablespaces that: (1) are used by the tablespaces having the names received by related files identifier module 218 as an index or foreign key constraint, or (2) use the tablespaces having the names received by related files identifier module 218 as an index or foreign key constraint, or both (1) and (2). Related files identifier module 218 retrieves the names of all related tablespaces from the data dictionary in working data dictionary storage 234 and retrieves the filenames of these tablespaces from working control file storage 236 in one embodiment, or from production control files storage 224 in another embodiment. In one embodiment, the retrieval is performed by retrieving information in the control file stored in working production control file storage 236 or a temporal control file stored in production control file storage 224 using the latest-in-time information of such control file that is not later than the point in time specified. In another embodiment, the retrieval is performed using the current version of the control file stored in production control file storage 224. If tablespaces related to the tablespaces having the names received by related files identifier module 218 are identified as described above, related files identifier module 218 repeats the identification process using the tablespaces identified as related to identify files related to these files. Related files identifier module 218 continues identifying related tablespaces until no additional related tablespaces are identified, or every tablespace in the database is identified. In addition, some conventional database programs maintain multiple tablespaces in the same data file, and therefore any tablespace stored with one of the tablespaces specified at input 206 or identified by related files identifier module 218 is also identified as a related tablespace by related files identifier module 218.

In one embodiment, each data file restored contains transaction logs for the tablespaces in the file. In another embodiment, the transaction logs are stored in a separate file described in working control file storage 236 or production control file storage 224. Related files identifier module 218 identifies from the control file closest in time to the specified point in time and not later than the specified point in time if such control file is available, the location of the transaction logs and identifies them to related files identifier module 218. Related files identifier module 218 requests the transaction logs if necessary via input/output 202 and receives the restored transaction logs via input/output 202. Related files identifier module stores the transaction logs in working transaction table storage 236.

File restorer module 216 receives via input/output 202 the point in time to which the files it receives have been restored, which may be different from the point in time specified at input 204. In such case, file restorer module 216 passes the point in time of the files and the point in time specified at input 204 to database roll forward module 240. In one embodiment, each entry in the transaction logs stored in transaction log storage 232 is stored with a date, date and time, transaction counter or other identifier indicating the state of the database. Database roll forward module 240 applies to the tablespaces stored in working data file storage 230 the transactions between and inclusive of the point in time of the files and the point in time specified at input 204 using transaction logs stored in working transaction logs storage 232. If the transaction logs indicate transactions that will modify the data dictionary, database roll forward module 240 updates the data dictionary stored in working data dictionary storage 234. As the database roll forward module 240 applies each entry in the transaction logs, it maintains in working transaction table storage 236 a set of undo records, which describe how to undo the change made as a result of the application of the transaction logs. As the transaction logs stored in working transaction logs storage 232 indicate a transaction has been committed, database roll forward module 240 may delete, or marked as committed, the corresponding undo record in working transaction table storage 236.

When database roll forward module 240 has applied the transaction logs up to the point in time specified at input 204, certain transactions at that point in time may have been implemented, but not committed. A committed transaction is a transaction that is applied to the database, while uncommitted transactions are transactions which are applied to the database temporarily, and made permanent when a corresponding commit command is received. Database roll forward module 240 signals database undo module 242, which applies the undo records stored in working transaction table storage 236 to the database tablespaces in working data file storage 230 and, if necessary, to the working data dictionary stored in working data dictionary storage 234 to undo all uncommitted transactions.

At this point, all data files required to be updated in working data file storage have been updated and data dictionary entries required to have been updated are updated in working data dictionary storage 234. However, these files are not a part of the production files stored in production data file storage 220 and production data dictionary storage 222. The data dictionary entries for the tablespaces in working data file storage 230 must be spliced into the corresponding area of the production data dictionary stored in production data dictionary storage 222.

After database undo module 242 undoes any uncommitted transactions, database undo module 242 signals metadata deleter module 250. Metadata deleter module 250 receives the names of the tablespaces for which files were identified by related files identifier module 218 from related files identifier module 218. Metadata deleter module 250 deletes the data dictionary information related to the tablespaces having the names it receives in production data dictionary storage 222.

In one embodiment, data dictionary information in the production data dictionary stored in production data dictionary storage 222 is stored using a storage allocation table. The storage allocation table reserves blocks of storage in production data dictionary storage 222 for each of the tablespaces in the database and matches one or more blocks with one or more tablespaces or groups of tablespaces. Metadata deleter module 250 uses the allocation table to delete the data dictionary information associated with the tablespaces having the names received from related files identifier module 218. In one embodiment, deleting the data dictionary information involves marking the areas of the production data dictionary associated with the tablespaces identified by related files identifier module 218 as deleted in the storage allocation table, without physically deleting the information in the production data dictionary storage 222.

After metadata deleter module 250 deletes the data dictionary information for the tablespaces identified by related files identifier module 218, metadata deleter module 250 signals data dictionary splicer module 250. Data dictionary splicer module 252 receives the tablespace names from related files identifier module 218 or from metadata deleter module 250. Working data dictionary storage 234 contains its own allocation table similar to the allocation table described above. Data dictionary splicer module 252 uses this allocation table in the working data dictionary storage 234 to copy the data dictionary information related to the tablespaces having names it receives from working data dictionary storage 234 into production data dictionary storage 222. Data dictionary splicer module 252 updates the allocation table in production data dictionary storage 222 according to the data dictionary information copied from working data dictionary storage 234. When the data dictionary information is copied from working data dictionary storage 234 to production data dictionary storage 222, data dictionary splicer module 252 signals production control file adjuster module 260. Thus, the data dictionary information from working data dictionary storage 234 is added, that is "spliced," into the data dictionary stored in production data dictionary storage 222.

Production control file adjuster module 260 receives the file names including path identifiers into which the working data files are stored in working data file storage 230. Production control file adjuster module 260 modifies the file names associated with each of the tablespaces in production control file storage 224 to point to the updated files in working data file storage 230. In one embodiment, production control file adjuster module 260 signals file restorer module 216 which deletes the old production data files corresponding to the tablespaces restored by file restore module from production data file storage 220. The connection between file restorer module 216 and production data file storage 220 has been omitted to avoid cluttering the drawing. In an alternate embodiment, production control file adjuster module 260 uses an operating system (not shown) to copy or rename the files in working data file storage 230 to have the names of their counterparts in production data file storage 220.

In one embodiment, before the production data dictionary and production control file are modified, metadata deleter module 250 and production control file adjuster module 260 copy the production data dictionary and production control file, modify them as described above, and copy them back into their original locations. In addition, metadata deleter module or production control file adjuster module 260 signals the database program via an output (not shown) to suspend processing of the database. In another embodiment, the suspension is indicated but the copying is not performed.

Figure 3A:
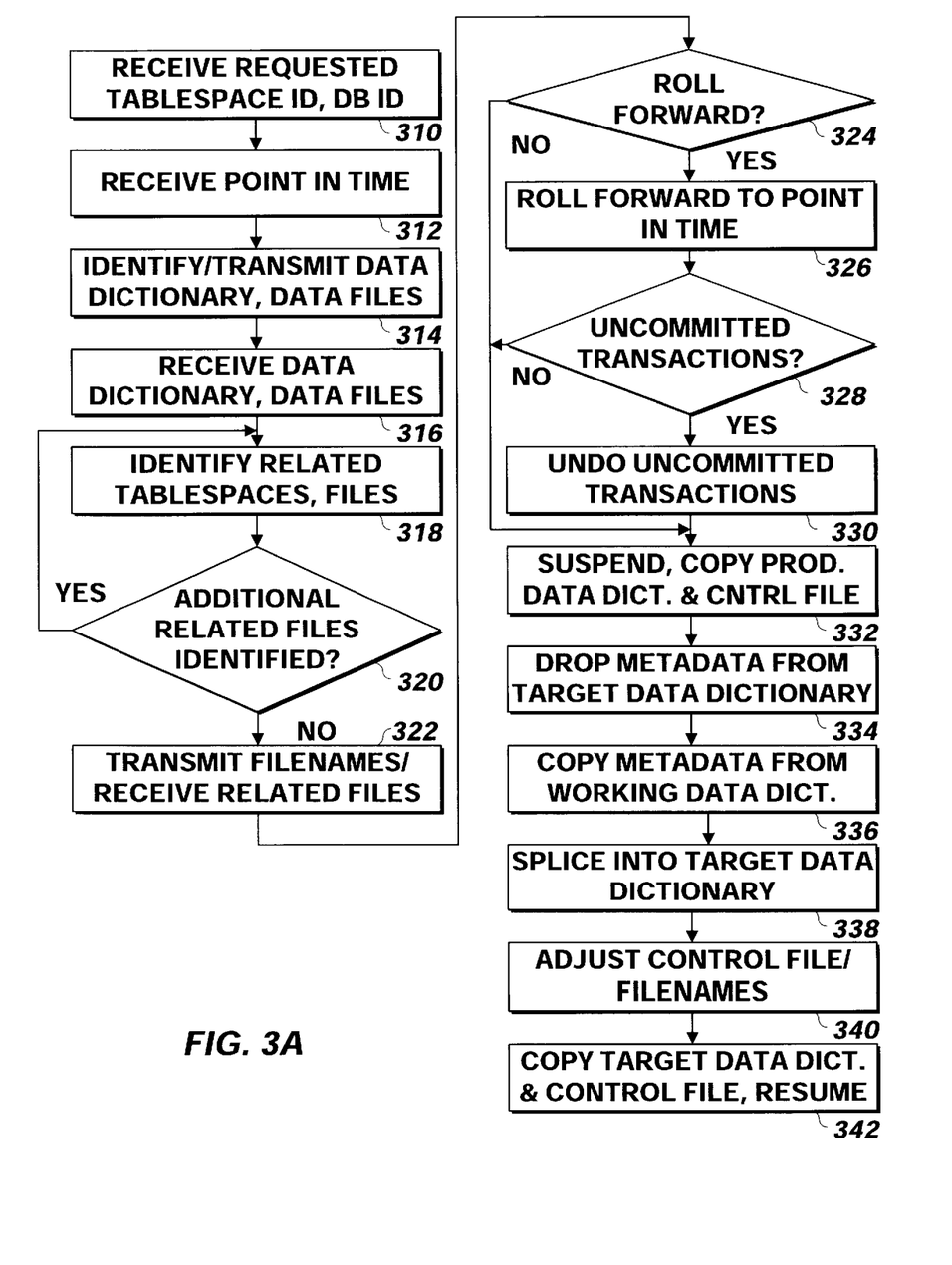
FIG. 3A is a flowchart illustrating a method of recovering a part of a database according to one embodiment of the present invention.

Referring now to FIG. 3A, a method of restoring a portion of the database is shown according to one embodiment of the present invention. Identifiers, such as names, of the database and tablespaces desired to be restored are received 310 in addition to the point in time of the desired restoration 312. In one embodiment, the identifier of the database is the filename of the control file of the database. In another embodiment, the identifier of the database is a name from which the filename of the control file may be inferred. The control file may be temporal, a non-temporal production control file, or a working control file may be restored, as described above.

The filenames of the data dictionary for the database and of the data files containing the tablespaces having the names received in step 310 are identified and transmitted 314 to request restoration. In one embodiment, the data dictionary is identified by providing the filename of the data dictionary from the control file and the point in time received in step 312. In one embodiment, the data dictionary is a part of the control file and step 314 is omitted. The names of the files containing the tablespaces having the names received in step 310 are identified using the control file of the database as described above. In one embodiment, the point in time received in step 312 is transmitted with the filenames as a part of step 314 to more completely specify the file desired. The filenames identified may be stored as a part of step 314.

The data dictionary and data files having the names transmitted in step 314 are received 316. In one embodiment, these files are received having been restored using conventional restoration methods or the methods in copending application, attorney docket number 1028, Ser. No. 08/962,087. In one embodiment, the files received are the files having the names transmitted in step 314, restored to the latest possible point in time that precedes the point in time received in step 312.

Tablespaces in the database related to the tablespaces having the names received in step 310 are identified 318, and the filenames of these tablespaces are identified using the control file, and these tablespace names and file names are stored. In one embodiment, related tablespaces are identified as described above using the data dictionary, and the filenames of the files containing these tablespaces are identified using a control file as described above.

If any such related tablespaces are identified 320, the method continues at step 318 to identify tablespaces related to the tablespaces identified in the preceding step 318. Step 318 is repeated until no additional tablespaces are identified as related that have not already been identified. In such case, the condition in step 320 indicates the "no" branch and the filenames of the related tablespaces identified in step 318 are transmitted for restoration as described above with respect to step 314. In one embodiment, the transmission of the filenames is made with the point in time received in step 312 to more specifically specify the files to be restored. The files received in step 322 are those files described by the filename, restored as late in time as possible, but not later than the point in time transmitted in step 322 as described above.

In one embodiment, the point in time at which the files were backed up is received with the files in step 322. If the point in time received in step 312 is different from the point in time that the files received in steps 316 and 322 were backed up, the tablespaces in files must be rolled forward 324, and otherwise the method continues at step 332.

In one embodiment, transaction logs for the database are restored and received with the data files as a part of steps 316 and 322 or with the data dictionary as a part of step 316. To roll the data files forward, the database of all data files received in steps 316 and 322 are rolled forward 326 to the point in time received in step 312 using the transaction logs as described above, updating the working data dictionary received in step 316, and maintaining information about how to undo the transaction. In one embodiment, the roll forward process is not limited to the tablespaces identified in steps 314 and 328. Instead all tablespaces in the files received in steps 316, 322 are rolled forward.

If, after rolling forward the tablespaces to the point in time received in step 312, there are uncommitted transactions 324, such transactions are undone 330 using the information maintained as a part of step 326. Otherwise, the method continues at step 332.

If desired, the data dictionary and control file operating as the production data dictionary and production control file may be copied 332 into a temporary data dictionary and control file so that the upcoming steps 334 through 342 are not applied to the production dictionary and production control files until these steps are complete. The metadata corresponding to the related files identified in step 314 is dropped 334 from the target data dictionary as described above. In one embodiment, the target data dictionary is the production data dictionary, and in another embodiment target data dictionary is copy of the data dictionary made in step 332. The metadata corresponding to the data files identified in steps 316 and 322 is copied 336 from a working data dictionary received in step 316 and adjusted as necessary in steps 326 and 330. This metadata is spliced 338 into the target data dictionary as described above. In one embodiment, the target data dictionary is the production data dictionary, and in another embodiment, the target data dictionary is the copy of the data dictionary made in step 332.

The control file is adjusted 340 to point to the data files restored in steps 316 and 322. In one embodiment, step 340 is performed by changing the names of the data files received in steps 316 and 322 to the names already in the control file.

If the data dictionary and control files were copied in step 328, they may be copied 338 into the file names storing the production data dictionary and control file. In one embodiment, step 332 includes instructing the database program to suspend operations other than read operations before the copy and step 342 includes directing the database to resume read and write operations.

Figure 3B:
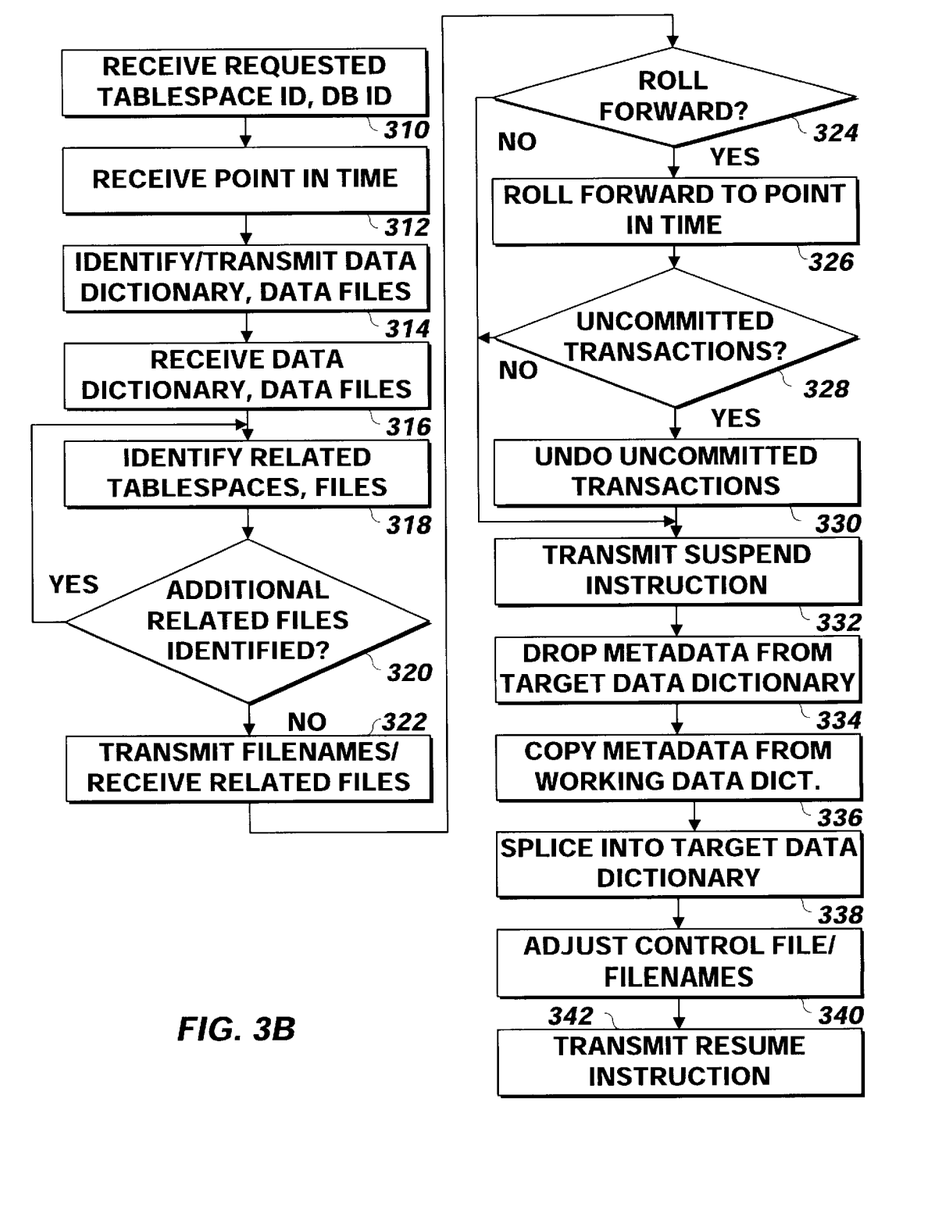
FIG. 3B is a flowchart illustrating a method of recovering a part of a database according to an alternate embodiment of the present invention.

In another embodiment, if steps 332 and 342 are omitted, step 332 is replaced by a step 333 directing the database program to suspend all operations and step 342 is replaced by a step 343 directing the database program to resume all operations. This embodiment is illustrated in FIG. 3B.

What is claimed is:

1. A method of recovering at least a portion of a database comprising at least one table, comprising:

receiving at least one identifier corresponding to the at least one table;

identifying at least one first file having an identifier and corresponding to the at least one identifier received;

adding less than all of at least one of the first files identified into a second file; and copying at least one of the at least one file identifiers into a third file.

2. The method of claim 1 wherein the second file comprises a data dictionary.

3. The method of claim 2 wherein the third file comprises a control file.

4. The method of claim 2 wherein at least one of the at least one identifiers received comprises a point in time, the method additionally comprising locating a version of the table representing the table not after the point in time and nearest to the point in time than other versions of the table.

5. The method of claim 4 additionally comprising updating the version of the table to represent the table at the point in time.

6. The method of claim 5 wherein the updating step comprises applying at least one recorded transaction to the table.

7. The method of claim 6 wherein the updating step additionally comprises undoing at least one transaction not committed at the point in time.

8. The method of claim 5 additionally comprising:

identifying at least one related table related to the at least one table; and updating the at least one related table to the point in time.

9. The method of claim 2 additionally comprising identifying at least one related table.

10. The method of claim 9 wherein at least one of the at least one related table identified comprises a table used by the at least one table.

11. The method of claim 9 wherein at least one of the at least one related table identified comprises a table using the at least one table.

12. The method of claim 9 wherein at least one of the at least one related table identified comprises a table using the at least one table as one selected from an index and a foreign key constraint.

13. The method of claim 9 wherein the at least one related table is stored in a file with at least one of the at least one tables.

14. A computer program product comprising a computer useable medium having computer readable program code embodied therein for recovering at least a portion of a database comprising at least one table, the computer program product comprising:

computer readable program code devices configured to cause a computer to receive at least one identifier corresponding to at the least one table;

computer readable program code devices configured to cause a computer to identify at least one first file having an identifier and corresponding to the at least one identifier received;

computer readable program code devices configured to cause a computer to add less than all of at least one of the first files identified into a second file; and computer readable program code devices configured to cause a computer to copy at least one the at least one file identifiers into a third file.

15. The computer program product of claim 14 wherein the second file comprises a data dictionary.

16. The computer program product of claim 15 wherein the third file comprises a control file.

17. The computer program product of claim 15 wherein at least one of the at least one identifiers received comprises a point in time, the computer program product additionally comprising computer readable program code devices configured to cause a computer to locate a version of the table representing the table not after the point in time and nearest to the point in time than other versions of the table.

18. The computer program product of claim 17 additionally comprising computer readable program code devices configured to cause a computer to update the version of the table to represent the table at the point in time.

19. The computer program product of claim 18 wherein the computer readable program code devices configured to cause a computer to update comprise computer readable program code devices configured to cause a computer to apply at least one recorded transaction to the table.

20. The computer program product of claim 19 wherein the computer readable program code devices configured to cause a computer to update additionally comprises computer readable program code devices configured to cause a computer to undo at least one transaction not committed at the point in time.

21. The computer program product of claim 18 additionally comprising:

computer readable program code devices configured to cause a computer to identify at least one related table related to the at least one table; and computer readable program code devices configured to cause a computer to update the at least one related table to the point in time.

22. The computer program product of claim 15 additionally comprising computer readable program code devices configured to cause a computer to identify at least one related table.

23. The computer program product of claim 22 wherein at least one of the at least one related table identified comprises a table used by the at least one table.

24. The computer program product of claim 22 wherein at least one of the at least one related table identified comprises a table using the at least one table.

25. The computer program product of claim 22 wherein at least one of the at least one related table identified comprises a table using the at least one table as one selected from an index and a foreign key constraint.

26. The computer program product of claim 22 wherein the at least one related table is stored in a file with at least one of the at least one tables.

27. An apparatus for recovering at least one table of a database, the apparatus comprising:
- a related files identifier module, having an first input operatively coupled to receive a name of the at least one table, the related files identifier module for identifying and providing at an output at least one name of at least one file, at least one of the at least one file comprising at least one of the at least one table;
- a working storage;
- a file restorer module coupled to the working storage and having a first input coupled to the related files identifier module output for receiving the at least one name, the file restorer module for restoring into the working storage coupled to an output at least one file corresponding to the name received at the file restorer module input and at least one first data dictionary;
- a data dictionary splicer module having an input operatively coupled to receive a portion comprising less than all of a second data dictionary corresponding to the at least one table, the data dictionary splicer for replacing less than all of the first data dictionary with the portion received at the data dictionary splicer output.

28. The apparatus of claim 27 wherein the at least one name of the at least one file provided by the related files identifier module comprises a related table related to at least one of the at least one table.

29. The apparatus of claim 28, wherein at least one of the at least one related table identified comprises a table used by the at least one table.

30. The apparatus of claim 28 wherein at least one of the at least one related table identified comprises a table using the at least one table.

31. The apparatus of claim 28 wherein at least one of the at least one related table identified comprises a table using the at least one table as one selected from an index and a foreign key constraint.

32. The apparatus of claim 28 wherein:
- the file restorer module comprises a second input operatively coupled to receive a point in time; and
- the file restored comprises a version of the file stored not later than the point in time and closer to the point in time than a plurality of versions of the file.

33. The apparatus of claim 28, additionally comprising a data base roll forward module coupled to the working storage and having an input operatively coupled to receive the point in time, the data base roll forward module for updating at least one table in at least one of the files in the working storage to represent the at least one table as of the point in time.

34. The apparatus of claim 33 additionally comprising a database undo module having an input operatively coupled to receive the point in time and coupled to the working storage, the database undo module for undoing transactions uncommitted in the at least one table updated by the database roll forward module as of the point in time.

35. The apparatus of claim 27 additionally comprising a production control file adjuster module coupled to a storage containing a control file for the database, the production control file adjuster for adjusting the control file to reference at least one file corresponding to a file restored to the working storage by file restorer module.

* * * * *

UNITED STATES PATENT AND TRADEMARK OFFICE
CERTIFICATE OF CORRECTION

PATENT NO. : 5,991,772

DATED : November 23, 1999

INVENTOR(S) : Cornelius G. Doherty, et al.

It is certified that error appears in the above-identified patent and that said Letters Patent is hereby corrected as shown below:

On claim 14, line 17, between "one" and "the", insert --of--.

Signed and Sealed this

Twenty-seventh Day of March, 2001

Attest:

NICHOLAS P. GODICI

Attesting Officer

Acting Director of the United States Patent and Trademark Office